Oct. 27, 1953     T C. NOON ET AL     2,656,848
DUPLEX FLOW CONTROL APPARATUS
Filed Feb. 19, 1951     2 Sheets-Sheet 1

Inventors:
T. Cyril Noon
Frank C. Bayer
by [signature] Attys

Oct. 27, 1953
T C. NOON ET AL
2,656,848
DUPLEX FLOW CONTROL APPARATUS
Filed Feb. 19, 1951
2 Sheets-Sheet 2
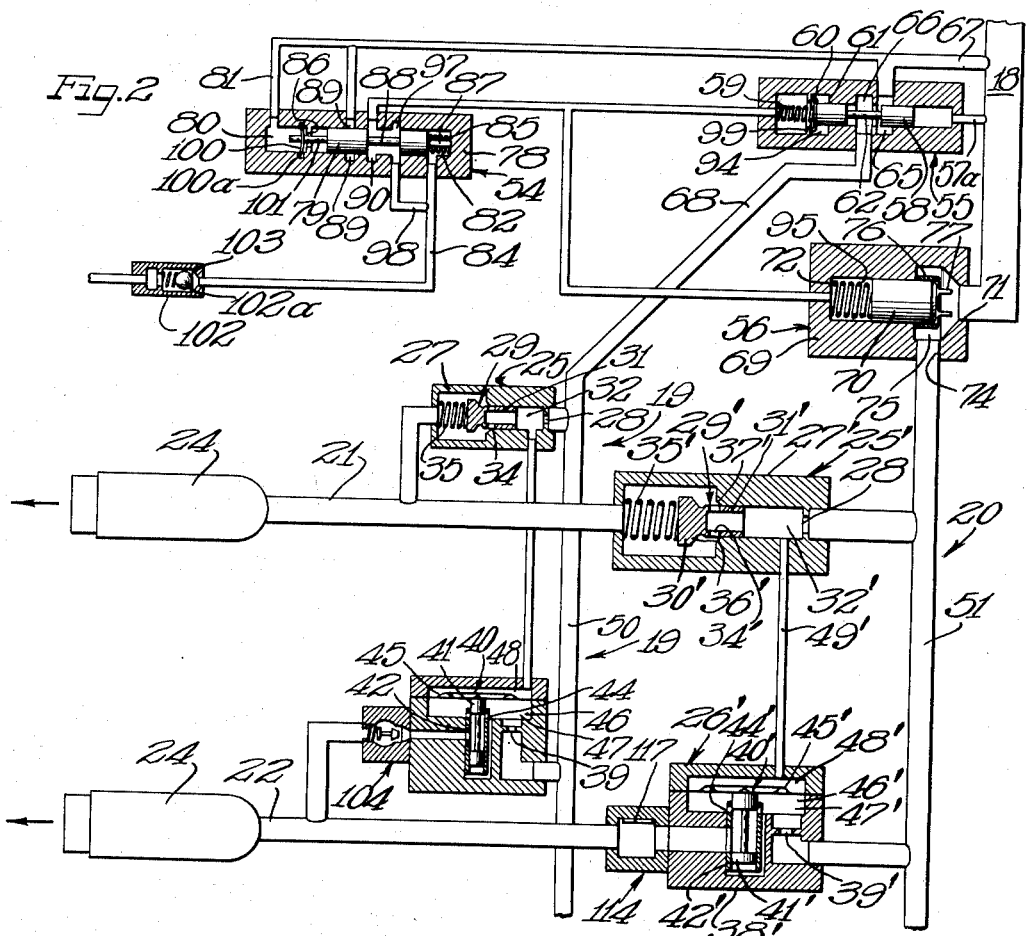
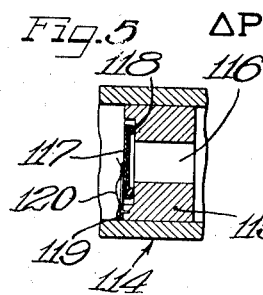
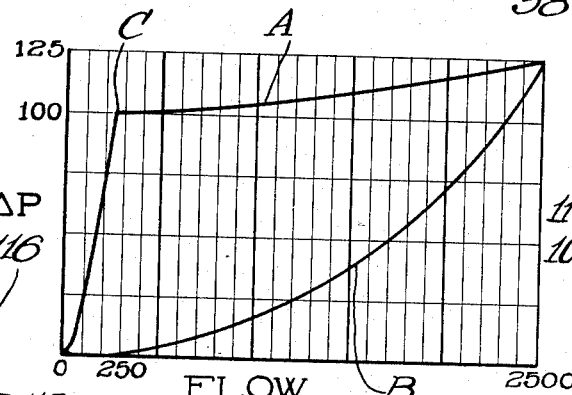
Inventors:
T Cyril Noon
Frank C. Bayer
by [signature] Attys Patented Oct. 27, 1953

2,656,848

UNITED STATES PATENT OFFICE 2,656,848

DUPLEX FLOW CONTROL APPARATUS

T Cyril Noon, Bainbridge Township, Geauga County, and Frank C. Bayer, Cleveland, Ohio, assignors to Thompson Products, Inc., Cleveland, Ohio, a corporation of Ohio Application February 19, 1951, Serial No. 211,692

18 Claims. (Cl. 137—118)

This invention relates to apparatus for accurately proportioning flow through a plurality of passages over a wide range of flow. More particularly, the invention relates to duplex flow control apparatus for accurately proportioning flow through a plurality of passages and including separate low flow and high flow apparatus with control means for effecting a smooth transition therebetween.

The flow through a plurality of passages may be more or less accurately proportioned by providing respective fixed area orifices of proportional areas in the passages and maintaining the pressure drop across these orifices equal. However, since the fixed orifices must be of a small enough size to accurately meter the lowest flow at which the system is designed to operate, the maximum flow through the passages may be unduly limited by the restriction of these metering orifices.

The present invention contemplates two such flow metering means in parallel for each of the passages, one for low flow and one for high flow. For utilizing this duplex type of flow system expeditious means are provided for shifting or shunting from low flow to high flow, and vice versa, in order that a smooth, uninterrupted flow will result over the entire increased flow range.

It is desirable that the pressure drop through the system over the high range be increased very little over the pressure drop at the upper end of the low flow range in order to preclude the necessity of excessively high supply pressure as the upper portion of the high flow range is approached.

It is, therefore, an object of the present invention to provide an improved system for accurately proportioning fluid flow through a plurality of passages over a wide range of fluid flow.

Another object of the invention is to provide a simplified duplex fluid metering system with improved transition means for shunting from low flow range to high flow range and vice versa.

A further object of the invention is to provide an improved and simplified duplex flow control system incorporating means for maintaining the pressure drop through the system substantially constant during the high flow range.

Still another object of the present invention is to provide improved transition valving means for use in a duplex flow control system.

A still further object of the invention is to provide improved flow check means for preventing back flow through the flow metering means of a flow control system.

Yet another object of the invention is to provide an improved flow control system for proportionally metering fluid flow through a plurality of passages in which the range of flow is greatly increased without any sacrifices in the accuracy of the metering.

An additional object of the present invention is to provide improved positive acting transition control means for shifting between high and low flow ranges in a duplex flow control system.

Another object of the invention is to provide improved throttling means for a duplex flow control system so that the increase in pressure drop across the high flow metering means will be at least partially compensated for by a decrease in pressure drop across the throttling means.

Other objects, features and advantages of the present invention will be apparent from the following detailed description of one preferred embodiment, by way of example only, taken in conjunction with the accompanying drawings, in which:

Figure 2 is a fragmentary schematic, partially sectional view similar to Figure 1 showing the system operating in the high flow range;

Figure 3 is a graphic illustration of the variation between fluid flow and pressure drop in the flow system according to the present invention as compared to a system utilizing only the high flow metering means;

Figure 4 is an enlarged fragmentary sectional view of a check valve for use with the low flow system; and Figure 5 is a fragmentary sectional view of a check valve used in the high flow system of the present invention.

Figure 1:
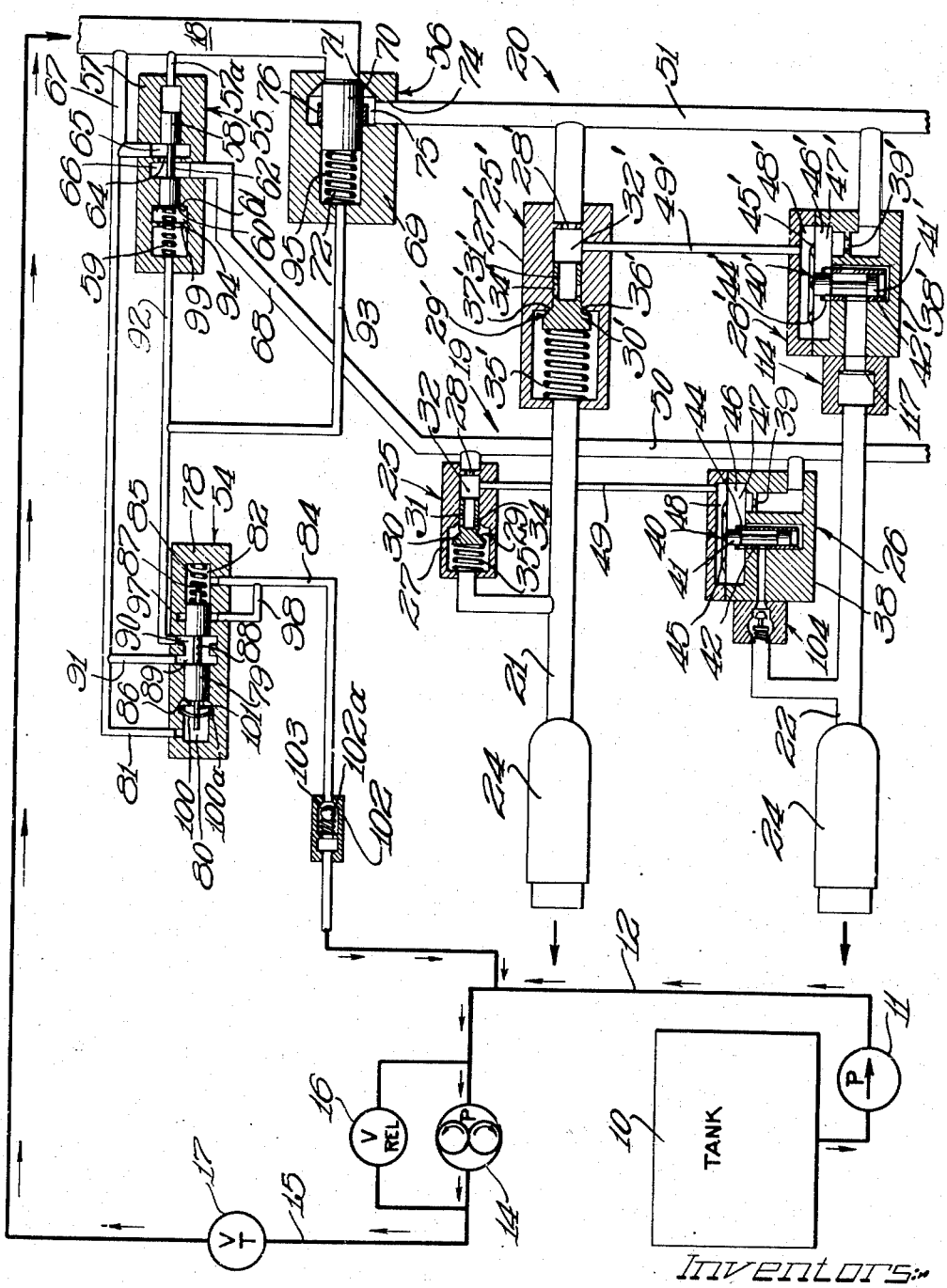
Figure 1 is a fragmentary schematic, partially sectional view of a duplex flow control system according to the present invention showing the system operating in the low flow range.

In Figures 1 and 2 there is illustrated a duplex flow control system for accurately metering flow through a plurality of passages over a wide range of fluid flow and including a low flow distributor system in parallel with a high flow distributor system.

As shown in Figure 1, fluid, such as aircraft engine fuel, is pumped from a tank 10 by means of a booster pump 11. From the booster pump 11 the fluid passes through a low pressure supply line 12 to a main pump 14 which may be an engine-driven gear pump on a gas turbine engine. Fluid at a relatively high pressure is delivered from the downstream side of the main pump 14 to a high pressure supply line 15. A pressure relief valve 16 is connected in parallel across the main pump 14 in order to prevent the supplying of fuel at an excessive pressure to the system. Fluid flow through the system is controlled by means of a throttle valve 17, located upstream of the main pump 14. The high pressure supply line 15 delivers fuel to a fuel supply manifold 18.

According to the present invention, duplex flow control means are provided for accurately proportioning fluid flow from the supply source through a plurality of passages over a wide range of total flow. In the present instance, such means comprise a low flow metering or distributor system 19 connected to the manifold in parallel with a high flow metering or distributor system 20. The low and high flow distributor system meters flow through a pilot passage 21 and a plurality of slave passages 22 (one shown) to deliver fluid to respective variable discharge nozzles 24. Any reasonable number of slave passages 22 may be provided, limited only by the capacity of the pump 14 and the fluid supply lines.

The variable discharge nozzles 24 may be of any suitable design to discharge fluid at a rate substantially proportional to the supply pressure over the entire flow range.

The low and high flow metering systems 19 and 20, respectively, are preferably substantially similar except for size. Accordingly, only the low flow metering system will be described in detail, and corresponding parts of the high flow metering systems have been given corresponding primed reference numerals. The low flow distributor system includes a pilot flow control valve 25 for metering flow through the pilot passage 21 and a flow divider 26 for each of the slave passages 22.

The pilot valve 25 comprises a body or casing 27 containing a fixed area metering orifice 28 upstream of a variable orifice assembly 29. The variable orifice assembly 29 includes a pilot plunger or piston 30 having a sleeve portion 31 slidably disposed in a pilot control pressure chamber or passage 32 within the casing 27. A plurality of radial apertures 34 are formed through the wall of the sleeve portion 31 and are closed by the surface of the passage 32 when the system is not operating. The pilot piston 30 is biased toward aperture closing position by a compression spring 35 to urge a frusto-conical valve portion 36 into conforming relation against a frusto-conical valve seat 37 formed at the downstream of the passage 32. Fluid pressure acts against the upstream portion of the pilot piston 30 to urge the variable orifice assembly 29 to the open position against the bias of the spring 35.

When the system is operating in the low flow range as shown in Figure 1, the high flow pilot valve 25' is in closed position and acts as a check valve to prevent back flow through the pilot portion of the high flow distributor 20.

The flow dividers 26 in the slave passages 22 comprise a body portion 38 containing a fixed area orifice 39 upstream of a variable orifice assembly 40. The variable orifice assembly 40 includes a pressure balanced valve plunger or piston 41 slidably disposed in a valve sleeve 42 and controlling flow through a plurality of apertures 44. The cross-sectional flow area of the variable area orifice 40 is controlled by a flexible diaphragm 45 which is operatively connected to one end portion of the valve piston 41. The diaphragm 45 is contained in and sealingly divides a control chamber 46 between the fixed orifice 39 and the variable orifice 40 into a flow chamber 47 and a pressure reference chamber 48. The flow chamber 47 acts as a portion of the flow conduit through the flow divider while the pressure chamber 48 is interconnected with the pilot control chamber 32 by means of an interconnect passage 49.

In order to insure equal pressures upstream of the fixed area orifices 28 and 39 in the low flow distributor, the pilot valve 25 and the flow dividers 26 are connected to a low flow fluid supply manifold 50 in the low flow distributor system 19 while the corresponding parts 25' and 26' are connected to a high flow fluid supply manifold 51 in the high flow distributor system 20.

In operation of the low distributor system described thus far, fluid passes through the pilot valve 25 varying the pressure in the pilot control chamber 32 in substantially direct proportion to the rate of flow therethrough. The pressure within the pilot control chamber 32 is referred to each of the slave pressure chambers 48. Since the diaphragms 45 are flexible and offer little resistance to movement in response to changes in pressure thereacross, the pressure in each of the slave flow chambers 47 is maintained at the same pressure as that in the reference chambers 48 by cooperation between the diaphragms 45 and the control valves 41.

If the pressure in the reference chambers 48 increases, the variable orifices 44 are biased toward closing position to increase the pressure in the flow chambers 47 in accordance with that in the chambers 48, and if the pressure in the reference chambers 48 decreases, the variable orifices 44 open wider to decrease the flow resistance and to decrease the pressure within the flow chambers 47. Thus, the pressure immediately downstream of each of the slave fixed orifices 39 is maintained equal to that immediately downstream of the fixed orifice 28 in the pilot valve, and since the respective pressures on each side of each of the fixed orifices are maintained equal, the respective flows through each of the orifices will be maintained in exact proportion with the respective flow areas.

The flow distributor systems 19 and 20 are of the "predicted error compensation" type wherein the springs 35, 35' in the pilot valves 25, 25' induce additional pressure drops therethrough to insure that the pressure requirements of the pilot passages 21, 21' are at least as great as those of slave passages 22, 22' with the greatest pressure requirements. This compensates for variations in pressure requirements, especially in the nozzles 24, due to manufacturing tolerances, etc., and insures that the system operates with uniform accuracy in metering.

In accordance with the concepts of the present invention, improved transition means are provided for insuring a smooth change-over between operation in the high flow range and in the low flow range and vice versa. Such means comprise generally a control valve 54, a shuttle valve 55, and a throttle valve 56.

The shuttle valve 55 is utilized as shown in Figures 1 and 2 and comprises a casing 57 having a plunger or piston 58 reciprocably mounted therein. A compression spring 59 biases the piston 58 in one direction to abut a stop plate 60, fixedly mounted to the spring-biased end of the piston, against a stop shoulder 61. When in this position a reduced diameter central stem portion 62 of the piston is disposed in spaced relation to a circular aperture 64 to provide a substantially unrestricted flow path between two axially spaced chambers 65 and 66. The chambers 65 and 66 are connected by respective passages 67 and 68 to the supply manifold 18 and the low flow manifold 50, respectively. The end of the piston 58 opposite to the spring 59 is referenced to the relatively high pressure of the supply manifold 18 by a passage 57a.

The throttle valve 56 provides variable pressure drop means for connecting the supply manifold 18 to the high flow manifold 51 during operation in the high flow range and for cutting off communication therebetween during operation in the low flow range. The throttle valve comprises a casing 69 having a plunger or piston 70 reciprocably mounted therein and biased toward closing relation to a coaxial aperture 71 by means of a compression spring 72 acting on its other end. The supply manifold 18 is connected to the aperture 71 and the high flow manifold 51 is connected to a radial aperture 74 which communicates with a chamber 75. The orifice 71 also opens into the chamber 75 when not closed by the piston 70.

For guiding the throttle valve piston 70 without materially restricting flow through the chamber 75 a guide sleeve 76 is disposed in the chamber in slidable conforming relation about the piston and in fixed relation relative to the casing 69. A plurality of axially extending integral fingers 77, herein shown as four (Figure 2), cooperate with the rest of the sleeve 76 to guide the piston 70 almost to the orifice 71.

The control valve 54 provides a positive pressure actuated means for controlling pressure actuation of the shuttle valve 55 and the throttle valve 56 to pressure lock the pistons of these valves in the low flow range and to permit pressure actuation of the pistons in the high flow range. The control valve 54 comprises a casing 78 having a control plunger or piston 79 reciprocably mounted therein. One end of the piston 79 is open to a coaxial chamber 80 which is referenced to the pressure in the supply manifold 18 by a supply passage 81. The other end of the piston 79 is open to a chamber 82 which is referenced to the relatively low booster pump pressure by means of a passage 84. The low pressure chamber 82 contains a compression spring 85 to abut the opposite end against a stop abutment 86 when the pressure within the chamber 80 is insufficient to overcome the bias of the spring 85 and the additional bias of the relatively low booster pump pressure.

When the pressure in the chamber 80 of the control valve 54 attains a sufficiently high value, the piston 79 is moved against the bias of the spring 85 until a stop abutment nose 87 contacts the end of the casing 78 to prevent further movement of the piston.

When the piston 79 is biased against the stop 86, a reduced diameter central stem portion 88 of the piston permits access between a pair of narrow coaxial chambers 89 and 90. The chamber 89 is connected to the supply manifold 18 by means of a passage 91. The chamber 90 is connected by respective passages 92 and 93 to respective chambers 94 and 95 within the shuttle valve 55 and the throttle valve 56, respectively. Chambers 94 and 95 contain the respective springs 59 and 72. Therefore, when the control piston 79 of the control valve 55 is in the position against the stop 86, the high pressure of the manifold 18 is referenced to both ends of both the shuttle valve piston 58 and the throttle valve piston 70. Hence, the bias of the respective springs 59 and 72 will hold the shuttle valve and the throttle valve pistons in the low flow range positions as shown in Figure 1.

When the pressure within the chamber 80 of the control valve 54 is sufficient to move the piston 79 against the bias of the spring 85, communication between the chambers 89 and 90 is blocked by the piston. At the same time communication is afforded between the chamber 90 and a third coaxial chamber 97 by means of the reduced diameter stem 88. The chamber 97 is referenced to booster pump pressure by means of a passage 98 and, therefore, booster pump pressure is now referenced to the shuttle valve chamber 94 and the throttle valve chamber 95 by means of the respective passages 92 and 93. As a result, the shuttle valve piston 58 and the throttle valve piston 70 are moved against the bias of the respective compression springs 59 and 72 by means of the relatively high pressure of the supply manifold 18.

In the case of the shuttle valve 55 this pressure biasing is sufficient to move the piston 58 to the high flow range position shown in Figure 2 with the stop plate 60 now abutting a stop ring 99 to prevent further movement against the bias of the spring 59. In this position of the shuttle valve piston, access between the chambers 65 and 66 is substantially restricted by a portion of the piston, and hence flow through the low flow system 19 is substantially reduced. However, this flow or leakage through the low flow system 19 with the shuttle valve piston 58 in the position shown in Figure 2 is still sufficient to insure proper operation of the low flow pilot valve 25 and the low flow dividers 26.

Substantially simultaneously with the above-described action of the shuttle valve 55, the throttle valve piston 70 begins movement against the bias of the spring 72 to permit flow of fluid from the supply manifold 18 through the aperture 71 and consequently into the high flow manifold 51 to operate the high flow pilot 25' and the high flow slave flow dividers 26'. The throttle valve 56 is so constructed that, upon opening, the pressure drop across it is substantially equal to that through the low flow system 19 immediately prior to transition. As a result, no pressure or flow irregularities occur at transition. As the pressure within the supply manifold 18 is further increased, the throttle valve piston 70 is further moved against the bias of the spring 72 to increase the effective flow area through the throttle valve, and at the same time to decrease the pressure drop therethrough. Thus, an increased fluid flow will result.

As the flow through the high flow system 20 increases the pressure drop across the high flow metering orifices 28' and 39' also increases. However, this increased pressure drop through the orifices is almost entirely compensated for by a decrease in pressure drop through the throttle valve 56, and therefore, the pressure drop through the entire system throughout the high flow range remains substantially constant at the value of the pressure drop at the upper end of the low flow range. A slight increase in the pressure drop with increase in flow is provided over the high flow range for stability purposes. As a result of the above-described coaction, a greatly expanded total flow range is attained by means of the present invention with a system pressure drop range substantially equal to that required for a single system flow apparatus.

Means are provided for stabilizing the operation of the control valve piston 79 to insure a positive movement of the piston between the two extreme positions. In the present instance, such means comprise a snap action leaf spring 100 fixedly attached at its central portion to the piston 79 as by attaching to an elongated stem 101. The opposite ends of the leaf spring 100 are retained in axial position in an internal groove 100a in the chamber 80 of the control valve casing 78.

In operation of the stabilizing means, when the control valve piston 79 is in the position shown in Figure 1, the leaf spring 100 will bias the piston against the stop 86 in addition to the bias of the compression spring 85. With the spring 100 in this position an appreciable portion of the pressure force against the end of the piston must be directed toward overcoming the inherent hysteresis of the leaf spring in order to move the piston against the bias of the compression spring 85. When a sufficiently high fluid pressure has been obtained in the chamber 80, the bias of both the snap spring 100 and the compression spring 85 will be overcome and the piston 79 will move against the bias of the compression spring. As the piston moves, the bias of the snap spring 100 rapidly decreases to a zero value at the halfway position, and upon further movement the snap spring reverses and begins to bias the piston in opposition to the compression spring 85 with an increasing snap spring bias to augment the pressure bias of the piston. Thus, the piston 79 is compelled to move positively from one extreme position to the other and there is no danger of the control system 79 lagging between the extreme positions to create a substantial "dead band" resulting in instability of the operation of the system during this time.

In order to prevent back flow through the passage 84 from the booster pump pressure line 12 to the control valve 54 check valve means are provided in the line. Herein such means comprise a flow check valve 102. The check valve 102 affords little restriction to flow of fluid from the control valve 54 to the line 12 but effectively prevents back flow therebetween by action of a spring-biased check valve 102a against a ball seat 103.

Check valve means are provided for preventing back flow through the low flow slave flow dividers 26. For this purpose a low flow slave check valve 104 is disposed in the flow path downstream of each of the low flow dividers 26. Each of the check valves 104 comprises a valve sleeve 105 (Figure 4) having a frusto-conical valve seat 106 in the upstream end portion. A valve member 107 is movable within the sleeve 105 in spaced relation thereto and has a frusto-conical valve portion 108 on its upstream end portion complementary to and adapted to cooperate with the valve seat 106. A substantially frusto-conical compression spring 109 has its downstream end abutting a spring stop 110 in the downstream end portion of the sleeve 105. The spring 109 is inserted into a hollow 111 within the valve member 107 and abuts the upstream defining end portion of the hollow to urge the valve member in an upstream direction to seat the same. The spring 109 is of relatively light compression and offers little resistance to movement of the valve member 107 by fluid moving toward the nozzles 24.

For reducing the pressure drop past the valve member 107 in the check valve 104, the fluid may pass between the opposed portions of the valve member and the sleeve 105 or may pass through a plurality of apertures 112 communicating with the hollow 111 to provide an alternate path for the fluid. It is readily apparent that backflow through the check valve 104 will be prevented by seating of the valve member 107 against the sleeve valve seat 106.

In order to prevent back flow through the high flow dividers 26' which might occur during operation of the low flow system 19, high flow check means are provided. To this end, a high flow slave check valve 114 is disposed in the flow path downstream of each of the high flow dividers 26'. As seen in Figure 5, each of the check valves 26' comprises a body portion 115 disposed in the flow path and having a flow aperture 116 therethrough. A flapper valve disk 117 is disposed over the downstream end of the aperture 116 and has a resilient facing including a sealing bead or ring 118 in sealing relation about the aperture end when the valve is closed. The flapper valve disk 117 is pivotally mounted about a point 119 on the outer edge portion of the body 115. A wire spring 120 biases the valve 117 into closed position as shown in Figure 5. When the high flow system is in operation, the flapper valve 117 will assume the position shown schematically in Figure 2. With the flapper valve 117 in the position shown in Figure 2 the resistance to flow through the check valve 114 is practically negligible. It will be readily understood that backflow through the flow divider 26' will be prevented by closing of the flapper 117 as shown in Figures 1 and 5.

In Figure 3 is illustrated a flow diagram showing overall system pressure drop plotted versus fluid flow for the system according to the present invention and for a single flow system embodying only the elements of the high flow distributor. It will be noted that practically no pressure drop occurs in the single flow system curve B for the low portion of the flow range, resulting in very poor fluid metering control over this range. This will be readily understood since the control medium in a system of this type is the pressure drop across the matched orifices, and if there is practically no pressure drop, there is practically no control.

Curve A in Figure 3, illustrating the flow characteristics of the system according to the present invention, shows that the pressure drop increases fairly rapidly with the increase in flow over the low flow range, thereby providing the proper medium for sensitive control of the flow through the various passages. At point C on curve A the control valve 54 shifts to high flow position, thereby permitting variable opening of the throttle valve 56 in relation to the fluid pressure in the supply manifold 18. It will be noted that from this point to the end of the high flow range the increase in overall system pressure drop is very slight for a large increase in flow. It will be further understood that this slight pressure drop increase in relation to large flow increase does not necessitate a decrease in sensitivity of flow control since this phenomena is a result of the decrease in pressure drop across the throttle valve 56 as the flow increases. Thus, the overall system pressure drop is maintained within a convenient range throughout the high flow range.

From the above description it will be understood that the present invention provides a substantially improved flow system for accurately proportionally metering the flow through a plurality of passages over a very wide range of total flow. This desirable result is obtained by the utilization of a low flow metering system connected in parallel with a high flow metering system together with improved automatically pressure-actuated control means for shifting or shunting from low flow range to high flow range without any disturbance of the flow. The control means also include a novel throttle valve arrangement providing decreased pressure drop with increased flow therethrough to maintain the overall system pressure drop at a substantially constant value throughout the high flow range. Particularly adaptable check valve means are provided for preventing backflow through the low flow and high flow systems. The control valve contains a snap action mechanism to prevent instability of flow during the shift between low flow and high flow range.

It will be understood that modifications and variations may be effected without departing from the scope of the novel concepts of the present invention.

We claim as our invention:

1. A fluid flow control system for accurately proportioning flow from a supply source under pressure through a plurality of passages over a wide range of fluid flow, comprising a first division of the system including a first flow fluid supply manifold having outlets for respective connection to said passages, and means downstream of said first flow manifold outlets for proportionally metering flow through the passages over a first portion of the flow range and including respective fixed area orifices upstream of respective pressure-actuated variable area orifices controlling flow from said first flow manifold outlets to said passages, a second division of the system including a second flow fluid supply manifold having outlets for respective connection to said passages, and means downstream of said second flow manifold outlets for proportionally metering flow through the passages over a second portion of the flow range and including respective fixed area orifices upstream of respective pressure-actuated variable area orifices controlling flow from said second flow manifold outlets to said passages, pressure responsive means for controlling flow from said fluid supply source to said first flow manifold, pressure responsive means for controlling flow from said fluid supply source to said second flow manifold, and valve means for selectively supplying high and low pressures to said pressure responsive means for selectively opening one of said valve means while substantially restricting the other valve means to selectively shunt delivery of fluid from said source first to said first division of the system and then to the second division of the system in accordance with the supply source pressure.

2. A fluid flow control apparatus for accurately proportioning flow from a supply source under pressure through a plurality of passages over a wide range of flow comprising a first system for proportionally metering flow through the passages over a first portion of the flow range and including a first flow fluid supply manifold having outlets for connection with said passages and respective fixed area orifices upstream of respective pressure-actuated variable orifices controlling flow of fluid from said first flow manifold outlets to said passages, a second system for proportionally metering flow through the passages over a second portion of the flow range and including a second flow fluid supply manifold having outlets for connection with said passages and respective fixed area orifices upstream of respective pressure-actuated variable area orifices controlling flow of fluid from said second flow manifold outlets to said passages, a shuttle valve between said fluid supply source and said first flow manifold for permitting substantially unrestricted flow to said first flow manifold during said first portion of the flow range and for substantially restricting flow to said first flow manifold during said second portion of the flow range, and a control valve operatively connected to said shuttle valve to control actuation of the same for shifting between said first and said second portions of the flow range.

3. A fluid flow control apparatus for accurately proportioning flow from a fluid supply source under pressure through a plurality of passages over a wide range of total flow comprising a first system for proportionally metering flow through the passages over a first portion of the flow range including a first flow fluid supply manifold having outlets for connection with said passages and respective fixed area orifices upstream of respective pressure-actuated variable area orifices controlling flow of fluid from said first flow manifold outlets to said passages, a second system for proportionally metering flow through the passages over a second portion of the flow range and including a second flow fluid supply manifold having outlets for connection with said passages and respective fixed area orifices upstream of respective pressure-actuated variable area orifices, a shuttle valve having a reciprocable plunger therein biased toward opening position with respect to a control aperture therein controlling flow from said fluid supply source to said first flow manifold, means for introducing fluid pressure into said shuttle valve to bias the piston to a position substantially restricting said control aperture, a throttle valve having a reciprocable plunger therein biased for closing relation to an aperture controlling flow from said fluid supply source to said second flow manifold, a control valve operatively connected to said shuttle and throttle valve to control the same, a reciprocable piston mounted in said control valve and biased in one direction for preventing pressure biasing of said shuttle valve system and for preventing opening of said throttle valve aperture, fluid pressure biasing said control valve piston in the opposite direction to permit pressure biasing of said shuttle valve piston to restrict said shuttle valve control aperture and to permit pressure-biased opening of said throttle valve.

4. A fluid flow control apparatus for accurately proportioning flow from a fluid supply source under pressure through a plurality of passages over a wide range of fluid flow comprising a first system for proportionally metering flow through the passages over a first portion of the flow range and including a first flow fluid supply manifold having outlets for connection with said passages and respective fixed area orifices upstream of respective pressure-actuated variable area orifices controlling flow of fluid from said first flow manifold outlets to said passages, a second system for proportionally metering flow through the passages over a second portion of the flow range and including a second flow fluid supply manifold having outlets for connection with said passages and respective fixed area orifices upstream of respective pressure-actuated variable area orifices controlling flow of fluid from said second flow manifold outlets to said passages, pressure-actuated mechanism for shifting between said first and second portions of the flow range, a throttle valve between said fluid supply source and said first flow manifold controlling flow to said second system during said second portion of the flow range and said pressure-actuated mechanism locking said throttle valve during the first portion of the flow range to prevent flow to said second system during said first portion of the flow range, and respective variable area nozzles in said passages downstream of said first and second control systems.

5. In a duplex flow control apparatus including a first metering system for proportionally distributing flow through a plurality of passages over a first range of fluid flow and a second metering system for accurately proportioning fluid flow through the passages over a second range of fluid flow, a fluid supply, first and second flow fluid supply manifolds, having independent outlets communicating with said passages through said respective first and second metering systems, means for shifting between said first and second ranges of fluid flow comprising a shuttle valve having a mechanism defining a variable area aperture therein controlling communication between said fluid supply and said first flow manifold, means biasing said aperture defining mechanism toward open position of said aperture, means for impressing fluid pressure on said defining mechanism to substantially restrict said aperture, a throttle valve controlling communication between said fluid supply and said second flow manifold, means biasing said throttle valve toward closed position, means for impressing fluid pressure against said throttle valve to urge it toward open position, a control valve having pressure-sensitive mechanism to pressure lock said shuttle valve in open position and said throttle valve in closed position in one position of the control valve, said control valve releasing the locking pressure from said shuttle and throttle valve when in the opposite position.

6. A duplex flow control apparatus for accurately proportionally metering flow from a fluid supply source under pressure through a plurality of passages over a wide total range of fluid flow comprising a first fluid metering system including a first flow fluid supply manifold having outlets connecting respectively with said passages and respective fixed area orifices upstream of respective variable area orifices controlling flow from said first flow manifold outlets to said passages, a second fluid flow metering system including a second flow fluid supply manifold having outlets connecting respectively with said passages and second respective fixed area orifices upstream of respective variable area orifices controlling flow from said second flow manifold outlets to said passages, a two position shuttle valve between said fluid supply source and said first flow manifold permitting substantially unrestricted fluid flow to said first system over a first portion of the flow range and substantially restricting the flow to the first system over a second portion of the flow range, a throttle valve between said fluid supply source and said second flow manifold for preventing the flow to said second system during said first portion of the flow range, said throttle valve having means defining a pressure-actuated variable area aperture increasing in area and decreasing in flow resistance in response to increased fluid pressure, and control means for pressure-locking said shuttle valve and said throttle valve during said first portion of the flow range, said control means releasing the locking pressure during said second portion of the flow range.

7. In a duplex fluid flow control apparatus for proportionally metering flow from a fluid supply source under pressure through a plurality of passages over a wide range of total flow and including a first fluid metering system for proportioning flow through the passages over one portion of the flow range and a second fluid metering system for proportioning flow over a second portion of the flow range, a first flow fluid supply manifold having outlets connecting through said first fluid metering system with said passages, a second flow fluid supply manifold having outlets connecting through said second fluid metering system with said passages, means for controlling operation of said apparatus comprising a shuttle valve having a reciprocable piston therein, said shuttle valve having a control aperture therein controlling flow from said fluid supply source to said first flow manifold, spring means biasing said piston toward opening relation to said control aperture, fluid pressure biasing said piston toward a flow resisting relation to said control aperture, a throttle valve having a reciprocable plunger therein, a control aperture in said throttle valve controlled by said plunger and controlling flow from said fluid supply source to said second flow fluid supply manifold, spring means biasing said plunger toward closing relation to said throttle valve control aperture, and control means for pressure locking said shuttle valve in aperture opening position and said throttle valve plunger in aperture closing position during said first portion of the flow range, said control means releasing said locking pressure during operation of the apparatus in said high flow portion of the flow range.

8. In a duplex fluid flow control apparatus for accurately metering fluid flow through a plurality of passages over a wide range of total flow and including two fluid flow metering systems, a control valve for shunting between said systems comprising a casing having two overlapping sets of apertures, a piston reciprocably mounted therein for selectively closing non-overlapping apertures of said sets, a first piston stop, a compression spring biasing said piston toward said first stop, a second piston stop, means for impressing fluid pressure against said piston to urge it toward said second stop, and a snap spring connected to said piston for supplementally biasing the same toward the closest of said first and second stops with respect to said piston.

9. In a duplex flow control apparatus, a control valve comprising a casing, a piston reciprocably mounted in said casing for moving between two predetermined limit positions, said casing having a plurality of apertures therethrough including two overlapping sets, a high pressure fluid supply source connected adjacent one end of said piston, a low pressure fluid supply source connected adjacent the other end of said piston, a spring biasing said piston against said high pressure to permit communication between one set of said apertures, said piston interconnecting a second set of said apertures when urged by said high pressure against the bias of said spring, and a snap spring connected between said piston and said casing, said snap spring supplementally biasing said piston toward the nearest of said limit positions.

10. In a duplex fluid flow control system for accurately metering flow through a plurality of passages over a wide range of flow, two position shuttle valve means allowing substantially unrestricted flow therethrough in one position and substantially restricting the flow therethrough in the other position, said means comprising a casing, a piston reciprocably mounted in said casing, said casing having a control aperture therein, a compression spring acting on one end of said piston and biasing said piston toward said first position to permit unrestricted flow through said control aperture, a high pressure supply source continuously acting on the other end of said piston and biasing said piston toward said other position to substantially restrict flow to said control aperture, a low pressure supply source, and means for alternately selectively connecting said low pressure and said high pressure supply sources to the spring-biased end of said piston, whereby when said low pressure supply source is connected to said one spring-biased end of said piston, said high pressure source continuously acting on the other end of said piston is operative to move said piston to said other position to substantially restrict flow and when said high pressure source is connected to both ends of said piston, said spring is operative to move said piston to said one position to afford unrestricted flow.

11. In a duplex flow control apparatus for accurately proportioning fluid flow through a plurality of passages over a wide range of total flow and including a two-position pressure control valve, a two-position shuttle valve comprising a casing having a control aperture therein, a piston reciprocably mounted in said casing and controlling said control aperture, a spring biasing said piston toward one position to open said control aperture, a high pressure fluid supply source biasing said piston to the other position to substantially restrict said control aperture, fluid connection means between said control valve and the spring-biased end of said piston, a relatively low pressure fluid supply source connected to said control valve, said high pressure supply source being connected to said control valve, whereby low pressure and high pressure are alternately selectively exerted on the spring-biased end of the said shuttle valve piston to move the same between said two positions.

12. In a fluid flow control system for accurately proportionally metering flow from a fluid supply source under pressure through a plurality of passages including metering means with fixed area orifices upstream of respective pressure-actuated variable area orifices, check valves for preventing reverse flow through said orifices, each of said check valves comprising a body portion disposed in said passage and having a flow aperture therethrough, said body portion providing an annular shoulder within said passage downstream of said aperture, a flapper valve pivotally mounted on the downstream portion of said body, a spring biasing said flapper into sealing relation to said annular shoulder over the downstream end of said aperture, whereby flow through said aperture in an upstream direction is prevented and whereby flow through said aperture in a downstream direction biases said flapper for pivoting out of said flow stream to assure substantially negligible pressure drop through said valve.

13. In a duplex fluid flow control apparatus, means for alternately connecting a fluid supply source to a high flow fluid proportioning system and to a low flow proportioning system, comprising a high flow manifold having a plurality of outlets connecting with said high flow proportioning system, a low flow manifold having a plurality of outlets connecting with said low flow proportioning system, low flow valve means in one position affording fluid communication from said fluid supply source to said low flow manifold, high flow valve means controlling flow from said source into said high flow manifold and in one position affording fluid communication with said high flow manifold and in another position substantially restricting flow to said high flow manifold, said valve means having biasing chambers for receiving fluid under pressure to urge contemporaneously one of said valves into a position to direct flow into its associated manifold and the other of said valves into a position to substantially restrict flow to its associated manifold, and a control valve movable in response to the pressure from said fluid supply source to control the pressure in said biasing chambers for shunting delivery of fluid from said source to one of said manifolds while substantially restricting flow to the other of said manifolds.

14. In a duplex flow control apparatus, means for alternately connecting a fluid supply source to a high flow fluid proportioning system and to a low flow fluid proportioning system, comprising a high flow manifold having a plurality of outlets connecting with said high flow proportioning system, a low flow manifold having a plurality of outlets connecting with said low flow proportioning system, low flow valve means in one position affording fluid communication from said fluid supply source to said low flow manifold, high flow valve means controlling flow from said source into said high flow manifold and in one position affording fluid communication with said high flow manifold and in another position substantially restricting flow to said high flow manifold, said valve means having biasing chambers for receiving fluid under pressure to urge contemporaneously one of said valves into a position to direct flow into its associated manifold and the other of said valves into a position to substantially restrict flow to its associated manifold, and a control valve movable in response to the pressure from said fluid supply source to control the pressure in said biasing chambers for shunting delivery of fluid from said source to one of said manifolds while substantially restricting flow to the other of said manifolds, said control valve having a piston reciprocably mounted therein, a first piston stop, a compression spring biasing said piston toward said first stop, a second piston stop, means for impressing fluid pressure from said source against said piston to urge it toward said second stop, said piston in one position conducting fluid from a source of fluid under pressure to said biasing chambers, and in the other position cutting off said source of fluid pressure, and a snap spring connected to said piston for supplementally biasing the same toward the closest of said first and second stops for promoting a snap shifting from high to low and from low to high flow ranges.

15. In a duplex flow control apparatus, means for alternately connecting a fluid supply source to a high flow fluid proportioning system and to a low flow fluid proportioning system, comprising a high flow manifold having a plurality of outlets connecting with said high flow proportioning system, a low flow manifold having a plurality of outlets connecting with said low flow proportioning system, low flow valve means in one position affording fluid communication from said fluid supply source to said low flow manifold, high flow valve means controlling flow from said source into said high flow manifold and in one position affording fluid communication with said high flow manifold and in another position substantially restricting flow to said high flow manifold, said valve means having biasing chambers for receiving fluid under pressure to urge contemporaneously one of said valves into a position to direct flow into its associated manifold and the other of said valves into a position to substantially restrict flow to its associated manifold, and a control valve movable in response to the pressure from said fluid supply source to control the pressure in said biasing chambers for shunting delivery of fluid from said source to one of said manifolds while substantially restricting flow to the other of said manifolds, said control valve comprising a casing, a piston reciprocably mounted in said casing for moving between two predetermined limit positions, said casing having a plurality of apertures therethrough including two overlapping sets, a high pressure fluid supply source connected adjacent one end of said piston, a low pressure fluid supply source connected adjacent the other end of said piston, a spring biasing said piston against said high pressure to permit communication between one set of said apertures, said piston interconnecting a second set of said apertures when urged by said high pressure against the bias of said spring, and the common aperture between said two overlapping sets communicating with said biasing chambers, and a snap spring connected between said piston and said casing, said snap spring supplementally biasing said piston toward the nearest of said limit positions.

16. In a duplex flow control apparatus, means for alternately connecting a fluid supply source to a high flow fluid proportioning system and to a low flow fluid proportioning system, comprising a high flow manifold having a plurality of outlets connecting with said high flow proportioning system, a low flow manifold having a plurality of outlets connecting with said low flow proportioning system, low flow valve means in one position affording fluid communication from said fluid supply source to said low flow manifold, high flow valve means controlling flow from said source into said high flow manifold and in one position affording fluid communication with said high flow manifold and in another position substantially restricting flow to said high flow manifold, said valve means having biasing chambers for receiving fluid under pressure to urge contemporaneously one of said valves into a position to direct flow into its associated manifold and the other of said valves into a position to substantially restrict flow to its associated manifold, and a control valve movable in response to the pressure from said fluid supply source to control the pressure in said biasing chambers for shunting delivery of fluid from said source to one of said manifolds while substantially restricting flow to the other of said manifolds, one of said valve means comprising a two-position shuttle valve affording substantially unrestricted flow therethrough in one position and substantially restrict flow therethrough in the other position, said valve comprising a casing, a piston reciprocably mounted in said casing, said casing having a control aperture therein, a compression spring biasing said piston toward said one position to afford unrestricted flow through said control aperture, the pressure in said biasing chamber being operative to bias said piston toward said other position to substantially restrict flow through said control aperture.

17. In a duplex flow control apparatus, means for alternately connecting a fluid supply source to a high flow fluid proportioning system and to a low flow fluid proportioning system, comprising a high flow manifold having a plurality of outlets connecting with said high flow proportioning system, a low flow manifold having a plurality of outlets connecting with said low flow proportioning system, low flow valve means in one position affording fluid communication from said fluid supply source to said low flow manifold, high flow valve means controlling flow from said source into said high flow manifold and in one position affording fluid communication with said high flow manifold and in another position substantially restricting flow to said high flow manifold, said valve means having biasing chambers for receiving fluid under pressure to urge contemporaneously one of said valves into a position to direct flow into its associated manifold and the other of said valves into a position to substantially restrict flow to its associated manifold, and a control valve movable in response to the pressure from said fluid supply source to control the pressure in said biasing chambers for shunting delivery of fluid from said source to one of said manifolds while substantially restricting flow to the other of said manifolds, said high flow valve means comprising a casing having a control aperture therein interposed between said fluid pressure supply source and said high flow manifold, a plunger reciprocably mounted in said casing and controlling said aperture, and a compression spring biasing said plunger toward closing relation to said aperture, the pressure in said biasing chamber being operative to urge said piston bias of said spring means, said plunger proportionally moving against the bias of said spring in response to the pressure of said fluid supply source when said control valve is acting to shunt fluid to said high flow manifold.

18. In a duplex flow control apparatus including high pressure and low pressure sources and high flow and low flow metering systems, a throttle valve for controlling said high flow metering system comprising a casing having a control aperture opening into one axial end face thereof, said casing having walls defining an interior enlarged chamber connecting with said aperture and a radial part leading from said enlarged chamber to the exterior of said casing, said casing further having a cylindrical bore axial of said aperture and extending from said chamber toward the other axial end of said casing, a guide sleeve disposed in said chamber in spaced relation to the walls thereof and between said aperture and said bore and having a plurality of axially extending spaced integral fingers extending toward said aperture, the spaces between said fingers affording communication between said aperture and said radial port, a plunger reciprocably mounted in the forward portion of said bore and in said sleeve for guiding by said fingers into closing relation to said aperture, spring means in said bore behind said plunger urging the same toward said aperture, and a passage leading from the exterior of said casing to said bore for selective connection to said high pressure and low pressure sources.

T CYRIL NOON.
FRANK C. BAYER.

References Cited in the file of this patent

UNITED STATES PATENTS

| Number | Name | Date |
|---|---|---|
| 176,500 | Woodward | Apr. 25, 1876 |
| 822,519 | Geare | June 5, 1906 |
| 1,274,680 | Calvert | Aug. 6, 1918 |
| 1,843,953 | McKinney | Feb. 9, 1932 |
| 2,306,029 | Salzer | Dec. 22, 1942 |
| 2,361,227 | Mock | Oct. 24, 1944 |
| 2,365,095 | Miller | Dec. 12, 1944 |
| 2,389,667 | Hudson | Nov. 27, 1945 |
| 2,460,774 | Trautman | Feb. 1, 1949 |

FOREIGN PATENTS

| Number | Country | Date |
|---|---|---|
| 577,132 | Great Britain | May 7, 1946 |